United States Patent Office 3,507,959
Patented Apr. 21, 1970

3,507,959
6β,7β-EPOXYSTEROIDS
Henry Laurent, Hermann Steinbeck, and Rudolf Wiechert, Berlin, Germany, assignors to Schering AG, Berlin, Germany
No Drawing. Filed Mar. 19, 1968, Ser. No. 714,341
Claims priority, application Germany, Mar. 23, 1967, Sch 40,435; Mar. 31, 1967, Sch 40,469; Jan. 11, 1968, Sch 41,823
Int. Cl. C07c 173/00
U.S. Cl. 424—241      14 Claims

ABSTRACT OF THE DISCLOSURE

6β,7β-epoxysteroids of the formula

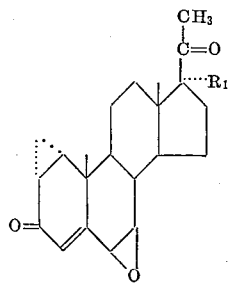

wherein $R_1$ is hydroxy or acyloxy.

An example is 17 - acetoxy-6β,7β-epoxy-1α,2α-methylene-4-pregnene-3,20-dione.

The compounds are made by reacting corresponding 6β-hydroxy or acyloxy-7α-halogenosteroids with a base in an inert solvent and, if desired, esterifying any free 17-hydroxy group, the halogen in the starting compound being chlorine or bromine. The compounds have a strong progestational action, particularly after oral administration and do not cause oval suppression even at high doses.

CROSS-REFERENCE TO RELATED APPLICATIONS

The 6β-hydroxy or 6β - acyloxy-7α-halogenosteroids which form the starting products for the process of the present invention are more specifically described and claimed in the application of the same inventors filed concurrently herewith Ser. No. 714,342 and entitled "Process for Making 1,2α-Methylenesteroids and Products Obtained Thereby."

BACKGROUND OF THE INVENTION

Steroids with a progestational action are known. The difficulty with most of these compounds is, however, that they have a more or less strong antiandrogenic side effect. They furthermore usually produce a central inhibitory effect, such as ovulation suppression, when given at high doses.

SUMMARY OF THE INVENTION

It is therefore an object of the present invention to obtain a steroid composition which has a strong progestational action particularly in case also of oral administration but has no, or very little, antiandrogenic side effects and does not produce ovulation suppression even in case of a high dose.

This is accomplished by compounds of the formula

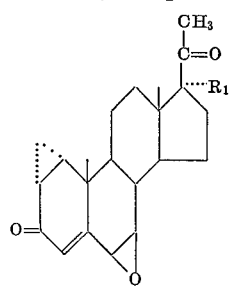

wherein $R_1$ is hydroxy or acyloxy.

The compounds of the invention are made by reacting steroids of the general formula

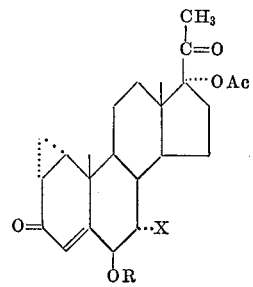

wherein R is hydrogen or acyl, X is chlorine or bromine, and Ac is acyl.

with a base in the presence of a solvent that is inert to the components of the reaction. If there is a free 17-hydroxyl group in the final compound, it may then be subjected to esterification.

DESCRIPTION OF THE PREFERRED EMBODIMENTS

As has been stated above, the compounds of the invention are 17-hydroxy or acryloxy steroids and so are the starting products. The reaction consists in converting the substituents in the 6β and 7α position to a 6β,7β-epoxy bridge. The term "acyl" in the starting and final products refers to the acid residues derived from acids such as are conventionally employed for esterifications in steroid chemistry. Preferred acids are carboxylic acids with up to 15 carbon atoms. The carboxylic acids can also be unsaturated, branched, polycarboxylic, or they may be substituted in the conventional manner, for instance by hydroxy, amino or oxo groups or halogen atoms. Useful are also cycloaliphatic, aromatic, mixed aromatic-aliphatic or heterocyclic acids, which may be substituted again in the conventional manner. Preferred acids for forming the acyl residue are, for instance, the following: acetic acid, propionic acid, caproic acid, enanthic acid, undecylic acid, oleic acid, trimethyl acetic acid, halogeno-acetic acid, dichloro-acetic acid, cyclopentyl propionic acid, phenyl propionic acid, phenyl acetic acid, phenoxy acetic acid, dialkylamino acetic acid, piperidino acetic acid, succinic acid, benzoic acid, etc. If water-soluble compositions are desired, esters of inorganic acids are preferred, such as the esters of sulfuric and phosphoric acids.

The 6β,7β-epoxy-1α,2α-methylenesteroids have valuable pharmacological properties. They have a surprisingly strong progestational action, particularly after oral administration. A particular advantage of the compounds lies in the fact that they have practically no antiandrogenic side action. Surprisingly, the new compounds furthermore have no central suppressive effects (ovulation suppression) at high doses.

The following table shows the superiority of the compounds of the invention as appearing in the 17-acetoxy-6β,7β-epoxy-1α,2α-methylene - 4 - pregnene - 3,20 - dione (Compound I). For comparison purposes there is used the 6 - chloro - 17 - acetoxy - 4,6 - pregnadiene - 3,20 - dione (Compound II).

TABLE

| Compound | Clauberg-test p.o. unit value (mg.) | Ovulation suppression p.o. | | Antiandrogenic action p.o. | | |
| --- | --- | --- | --- | --- | --- | --- |
| | | Dose (mg.) | Suppression (percent) | Dose (mg.) | suppression (percent) | |
| | | | | | S.v. | Pr. |
| I | 0.001 | 10.0 | 0 | 10.0 | 30 | 3 |
| | | | | 3.0 | 0 | 0 |
| | | | | 1.0 | 0 | 0 |
| II | 0.03 | 1.0-3.0 | 50 | 3.0 | 44 | 45 |
| | | | | 1.0 | 18 | 15 |
| | | | | 0.3 | 0 | 0 |

The progestational effect was determined by the conventional Clauberg Test. The limit value was found by the total dose which effects a transformation and modification of the endometrium in at least two out of three rabbits. The ovulation suppression was checked by tubular inspection.

To determine the antiandrogenic side effects, castrated male rats were given daily doses per os (p.o.) of the compounds tested during a period of 7 days. During the same period, the animals were administered a daily dose of 0.1 mg. testosterone propionate by subcutaneous injection. On the 8th day, the animals were killed and the weight of the sex glands was determined. The percentage inhibition of the growth of the seminal vesicle (s.v.) and of the prostate gland (pr.) obtained by the tested compounds were then determined.

The main application of the compounds of the invention is in the treatment of the following gynecological disorders: primary and secondary amenorrhea, cycle irregularities in the case of insufficient yellow body function, endometritis, hypoplasia of the uterus, premenstrual complaints and mastopathy.

The dosage depends on the seriousness of the individual sickness. Generally, a daily dose between 5 and 100 mg. of active substance may be indicated.

The compounds of the invention can be used in pharmaceutical preparations suited for either oral or parenteral (intramasular) application. In the case of tablets, the contents of active material per tablet should be between 1 and 15 mg. In the case of aqueous solutions for oral application, the contents of active compounds should be between 0.2 and 2 mg. per 1 ml., and in the case of oily solutions for intramuscular injection, it should be between 1 and 20 mg. per 1 ml.

The pharmaceutical compositions can be prepared in conventional manner by combining the active materials with suitable additives, carrier substances and flavoring substance.

Carrier vehicles for the active compounds may be organic or inorganic materials which are suited for enteral or parenteral application and which do not enter into reaction with the new compounds, such as water, alcohols, vegetable oils, polyethyleneglycols, lactose, starch, talcum, gelatin, magnesium stearate or sodium lauryl sulfate.

A suitable composition for a tablet would be, for instance, the following:

| | Mg. |
| --- | --- |
| 17 - acetoxy - 6β,7β - epoxy-1α,2α-methylene-4-pregnene - 3,20 - dione | 5.000 |
| Lactose | 24.000 |
| Cornstarch | 45.065 |
| Talcum | 4.000 |
| Gelatin | 1.400 |
| Sodium lauryl sulfate | 0.500 |
| p-Oxybenzoic acid methylester | 0.024 |
| p-Oxybenzoic acid propylester | 0.011 |
| | 80.000 |

A suitable oily solution for intramuscular injection should, for instance, contain per each ml. of solution the following:

| | Mg. |
| --- | --- |
| 17-acetoxy - 6β,7β - epoxy - 1α,2α - methylene-4-pregnene - 3,20 - dione | 2.0 |
| Benzylalcohol, and | 20.0 |
| Sesame oil | 905.9 |
| 1 ml. | 927.9 |

For the oral application, the compounds may be used in the form of tablets, lozenges, capsules, pills, suspensions or solutions.

The compounds of the invention may be made by subjecting a 6β-hydroxy or acyloxy-7α-halogenosteroid of the formula

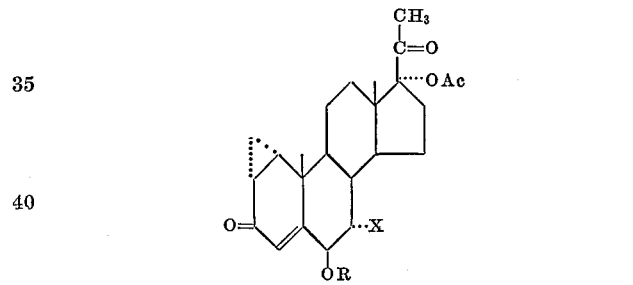

wherein R is hydroxy or acyl, X is chlorine or bromine, and Ac is acyl;

to reaction with a base in a solvent that is inert to the components of the reaction, whereupon a free 17-hydroxyl group may then be subjected to esterification. The inert solvents preferably are water-miscible solvents, such as methanol, ethanol, acetone, tetrahydrofuran, or dimethylsulfoxide, or mixtures of these solvents, such as a mixture of ethanol with acetone.

The bases employed for the oxiran ring closure of the invention are, for instance, alkali metal carbonates and bicarbonates, such as potassium carbonate or sodium bicarbonate; alkali metal hydroxides, such as potassium or sodium hydroxide; alkali metal alcoholates, such as potassium tert. butylate, etc.

Depending on the strength of the base employed and the upper limit of the reaction temperature, a more or less significant portion of saponified product is obtained. It is thus possible to obtain either free or esterified 17α-hydroxy compositions by a suitable choice of the reaction conditions. For instance, the 6β,7β-epoxide with an unmodified acyloxy group in the 17α-position is obtained with potassium carbonate in ethanol and acetone at room temperature. Under the same reaction conditions but employing elevated temperature and a reaction time of about 20 hours, an epoxide is obtained in which the 17-acyl group is largely saponified. Using potassium hydroxide as base, it is possible to obtain the 6β,7β-epoxide with the free 17α-hydroxy group already after a comparatively short reaction time at room temperature.

In order to carry out subsequent esterification or reacylation, whenever desired, of the 17α-hydroxy group, the reaction is preferably carried out with a reactive acid derivative in the presence of a basic agent. A specific example would be the reaction with an acid anhydride or acid halogenite in the presence of pyridine at elevated temperature.

As has already been stated, a process for making the 6β-hydroxy or acyloxy-7α-halogenosteroids which are used as starting products has been described in the above referred to co-pending application. This process proceeds from the corresponding Δ⁶-unsaturated steroids.

Thus, the following 6β-hydroxy-7α-halogenosteroids can, for instance, be made from 17-acyloxy-1α,2α-methylene-4,6-pregnadiene-3,20-dione with N-bromo- or N-chloro-succinimide and water in the presence of perchloric acid in dioxane:

7α-bromo-6β-hydroxy-17-acetoxy-1α,2α-methylene-4-pregnene-3,20-dione, M.P. 185–185.5° C.

7α-bromo-6β-hydroxy-17-hexanoyloxy-1α,2α-methylene-4-pregnene-3,20-dione in the form of an oil.

7α-chloro-6β-hydroxy-17-acetoxy-1α,2α-methylene-4-pregnene-3,20-dione, M.P. 239–239.5° C.

Similarly, the following starting products for use in the invention can be obtained from 17-acetoxy-1α,2α-methylene-4,6-pregnadiene-3,20-dione with N-bromo- or N-chloro-succinimide and the corresponding carboxylic acid in hydrogen-chloride-saturated tetrahydrofuran.

With acetic acid:

7α-bromo-6β,17-diacetoxy-1α,2α-methylene-4-pregnene-3,20-dione, M.P. 194–195° C.

7α-chloro-6β,17-diacetoxy-1α,2α-methylene-4-pregnene-3,20-dione, M.P. 237–238° C.

With formic acid:

7α-bromo-6β-formyloxy-17-acetoxy-1α,2α-methylene-4-pregnene-3,20-dione, M.P. 217–218.5° C.

7α-chloro-6β-formyloxy-17-acetoxy-1α,2α-methylene-4-pregnene-3,20-dione, M.P. 247–248° C.

The following examples will illustrate the invention without any intention of limitation.

Example I 100 g. 7α-bromo - 6β-hydroxy - 17-acetoxy-1α,2α-methylene-4-pregnene-3,20-dione was dissolved in 200 ml. ethanol and 100 ml. acetone and was then reacted with a solution of 10 g. potassium carbonate and 25 ml. water. The mixture was subjected to stirring for 48 hours at 25° C. and was then poured into water. The precipitate was removed by suction, washed, dried and recrystallized from acetone/hexane. There was obtained 7.15 g. 17-acetoxy - 6β,7β - epoxy - 1α,2α - methylene-4-pregnene-3,20-dione, M.P. 244–245° C. UV:

$\epsilon_{240}=15.800$

The same 6β,7β-epoxide could also be obtained in a similar manner from 7α-bromo-6β,17-diacetoxy-1α,2α-methylene-4-pregnene-3,20-dione and from 7α-bromo-6β-formyloxy-17-acetoxy-1α,2α-methylene-4-pregnene - 3,20-dione.

Example II

A solution of 1.2 g. 7α-chloro-6β-hydroxy-17-acetoxy-1α,2α-methylene-4-pregnene-3,20-dione in 24 ml. methanol was reacted with 600 mg. potassium carbonate in 3 ml. water and heated for 3 hours to boiling-point. The mixture was then poured into water and the precipitate was removed by suction, taken up in methylene-chloride, washed with water, dried, and concentrated in vacuo. After chromatography over silica gel, it was recrystallized from isopropylether. There was thus obtained 650 mg. 17 - acetoxy-6β,7β-epoxy-1α,2α-methylene-4-pregnene-3,20-dione, M.P. 240–242° C. UV:

$\epsilon_{240}=15.000$

The same 6β,7β-epoxide can also be made in a similar manner from 7α-chloro-6β,17-diacetoxy-1α,2α-methylene-4-pregnene-3,20-dione and from 7α-chloro-6β-formyloxy-17-acetoxy-1α,2α-methylene-4-pregnene-3,20-dione.

Exampl III 3.0 g. 7 α-bromo-6β-hydroxy-17-acetoxy-1a,2a-methylene-4-pregnene-3,20-dione was dissolved in 60 ml. ethanol, reacted with a solution of 1.5 g. potassium carbonate in 7.5 ml. water and heated for 24 hours to boiling-point. the mixture was then poured into water and the precipitate was removed by suction, washed, dried and recrystallized from acetone/hexane. There was obtained 1.56 g. 17 - hydroxy - 6β,7β - epoxy - 1α,2α-methylene-4-pregnene-3,20-dione, M.P. 280–283° C. UV: $\epsilon_{240}=15.100$.

Example IV

A solution of 500 mg. 7α-bromo-6β-hydroxy-17-acetoxy - 1α,2α - methylene - 4-pregnene-3,20-dione in 10 ml. ethanol and 5 ml. acetone was reacted with 2.5 ml. of a 20% aqueous potassium hydroxide solution and stirred for 30 minutes at room temperature. The mixture was poured into water and the precipitated material was removed by suction, washed with water, dried in a vacuum and recrystallized from acetone/hexane. There was obtained 297 mg. 17 - hydroxy - 6β,7β - epoxy-1α,2α-methylene - 4 - pregnene - 3,20-dione, M.P. 279–281° C.

Example V 1.0 g. 7α - bromo - 6β-hydroxy-17-hexanoyloxy-1α,2α-methylene-4-pregnene-3,20-dione was reacted under the conditions described in Example I above. The crude product was then subjected to chromatography over silica gel. This was followed by elution with 9–11% acetone-pentane and there was thus obtained 500 mg. 17-hexanoyloxy-6β, 7β - epoxy - 1α,2α - methylene - 4-pregnene-3,20-dione in the form of a viscous oil. UV: $\epsilon_{240}=15.400$. The oil solidified after a little while to a crystalline mass which melted at 129–130° C.

What is claimed as new and desired to be protected by Letters Patent is set forth in the appended claims:

1. 6β,7β - epoxysteroids of the formula

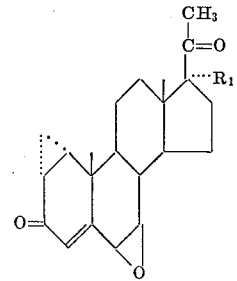

wherein $R_1$ is hydroxy or is acyloxy derived from carboxylic acids having up to 15 carbon atoms.

2. The compound of claim 1, wherein $R_1$ is derived from a carboxylic acid having up to 15 carbon atoms.

3. The product of claim 1 which is 17-hydroxy-6β,7β-epoxy-1α,2α-methylene-4-pregnene-3,20-dione.

4. The product of claim 1 which is 17-acyloxy-6β,7β-epoxy - 1α,2α-methylene-4-pregnene-3,20-dione, acyloxy having the meaning as in claim 1.

5. The product of claim 1 which is 17-acetoxy-6β,7β-epoxy - 1α,2α - methylene - 4 - pregnene-3,20-dione.

6. The product of claim 1 which is 17-hexanoyloxy-6β,7β-epoxy-1α,2α-methylene-4-pregnene-3,20-dione.

7. The process of making the compounds of claim 1, comprising reacting 6β-hydroxy or acyloxy-7α-halogeno-steroids of the general formula

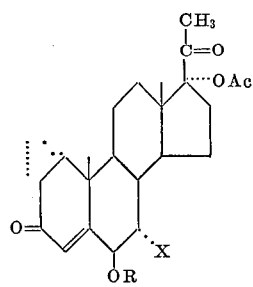

wherein R is hydrogen or acyl, X is chlorine or bromine, and Ac is acyl, with an inorganic base in a solvent that is inert towards the components of the reaction and at a temperature between about 0 and 100° C.

8. The process of claim 7 wherein the base is alkali metal carbonate, -bicarbonate, -hydroxide or alcoholate.

9. The process of claim 7, wherein the reaction is carried out at about room temperature and the base is sodium or potassium carbonate or sodium or potassium bicarbonate whereby an ester group present in the 17-position of the starting compound is retained in the final compound.

10. The process of claim 7, wherein the reaction is carried out at about room temperature and the base is sodium or potassium hydroxide whereby a 17α-hydroxy substituted final product is obtained.

11. The process of claim 10, wherein the product is subsequently subjected to esterification of the hydroxy group.

12. A pharmaceutical composition comprising a compound as defined in claim 1 and a pharmaceutically acceptable carrier therefor.

13. The method of administering to a patient requiring progestational treatment a compound as defined in claim 1 by oral application of tablets each containing 1 to 15 mg. of the said compound or aqueous solutions containing 0.2 to 2 mg. of said compound per each ml. of solution.

14. The process of applying to a patient requiring progestational treatment a compound as defined in claim 1 by intramuscular injection of an oily solution containing between 1 and 20 mg. of the said compound per each ml. of solution.

References Cited

FOREIGN PATENTS 1,320,556  1/1963  France.

LEWIS GOTTS, Primary Examiner

E. G. LOVE, Assistant Examiner

U.S. Cl. X.R.

260—239.5, 239.55, 397.4